United States Patent [19]

Woodside

[11] Patent Number: 5,560,579

[45] Date of Patent: Oct. 1, 1996

[54] BRACKET FOR HOLDING A GAME FISHING REEL

[75] Inventor: James M. Woodside, Newtown, Pa.

[73] Assignee: W.R.W. Industries, Inc., Trevose, Pa.

[21] Appl. No.: 452,710

[22] Filed: May 30, 1995

[51] Int. Cl.⁶ .................................................. A01K 97/10
[52] U.S. Cl. ........................... 248/316.8; 43/4; 248/298.1
[58] Field of Search ................................ 248/298, 309.2, 248/316.4, 316.8; 43/4, 22

[56] References Cited

U.S. PATENT DOCUMENTS

| | | | |
|---|---|---|---|
| 956,696 | 5/1910 | Frost | 248/298 |
| 2,628,799 | 2/1953 | Aaby | 248/298 |
| 3,362,738 | 1/1968 | Dygert et al. | 248/298 |

*Primary Examiner*—Jack W. Lavinder
*Assistant Examiner*—Allyson Abrams
*Attorney, Agent, or Firm*—Edward Sites

[57] ABSTRACT

An adjustable bracket is disclosed for holding a game fishing reel having harness lugs. The bracket has a fixed section that can be mounted on the bulkhead, overhead or the like of a boat or the ceiling or wall of a building. The bracket has a guide section for holding the reel. The guide section includes an elongated slot that extends the length of the guide section. A pair of opposing members are positioned within with the slot. The pair of opposing holders, each which has a stud which is spaced apart from and extends parallel the guide section of the bracket. The studs are sized to mate with the apertures of the harness lugs. At least one of the opposing members is manually releasable from the guide section so that the holders can be moved along the length of the guide section and then locked in placed at selected spaced relationship from the other holder. In use, a game fishing reel having a pair of harness lugs is locked in position by inserting one of the studs into the aperture of one of the harness lugs and then moving the opposing holder along the guide section until its stud engages the aperture of the other harness lug. The holder is then locked in place thereby securely holding the reel in position.

5 Claims, 2 Drawing Sheets

BRACKET FOR HOLDING A GAME FISHING REEL

BACKGROUND OF THE INVENTION

1. Field of the Invention

This invention relates to a bracket for holding a fishing reel and more particularly is concerned with an adjustable bracket for securely holding game fishing reels of different widths.

2. Background of the Invention

Sport fishing for large game fish, such as tuna, sail fish and the like, requires rods and reels designed and engineered specifically for this purpose. The reels are made with internal gear transmissions comprised of precisely machined gears. The gears and other components of the transmissions are machined to specifications that often exceed those of mechanical clocks. The fishing reels also include adjustable internal clutches for controlling "drag" to prevent surges on the fishing lines from breaking the line.

The controls for the reels are located on the exterior for use by a fisherman. These controls include a handle for the fisherman to grip and turn to cause the spool of the reel to rotate and let out or bring in fishing line. There are also levers for engaging and releasing the spool from the drive train. There are controls for adjusting the drag, which typically is star wheel also located on the exterior of the reel. Depending on the particular design of the reel there may also be other controls. All of the controls are fully exposed and unprotected from damage.

Most large game fishing reels haves lugs for attaching a harness to the reel. The harness is secured to the reel and to a fisherman using the rod and reel to assist the fisherman in holding and working the rod and reel.

Game fishing reels, besides being fine mechanical equipment, are often finished so as to be almost works of art. Most of the exposed parts are highly polished. The metal parts may be made of polished stainless steel or chrome plated marine grade brass. Many reels have exposed metal parts plated with gold to both give exceptional corrosion protection and to improve the physical appearance of the reels.

Sport fisherman take great pride in the working condition and appearance of their equipment. They take special care to maintain the mechanical condition and like new appearance of their reels. A long standing and heretofore unresolved problem encountered by fishermen is how to protect their equipment and particularly reels from being damaged when not in use. This is especially true if the rod and reels are stored on a boat. Game fishing reels can readily be damaged if allowed to be banged around in storage. The internal mechanism can have the gear trains jammed and individual gears bent so the reel will not operate properly. The exterior controls can similarly be damaged if the reel is not protected. The problems of protecting game fishing reels on board a boat are especially difficult to overcome. The rolling and pitching of a boat in rough water can result in substantial damage as the reels contact other reels, the bulk head, the deck and other equipment on board. Even if the reels are not mechanically damaged, the contact with other reels and the like can cause very undesirable damage to the appearance of the reels.

To protect reels from damage when not in use some fishermen remove the reels from their fishing rod and repackage them in the boxes received from the manufacturer or in special boxes made for this purpose. Some fishermen even go to the length of initially placing their reel in protective bags such as soft velvet bags before placing the reel in the boxes. This method does protect reels between use but is impractical in actual practice. Fishermen often use different rods and reel combination in a given day of fishing. Several types of reels may be used and the required change of reels can take place on short notice. Accordingly, the repackaging reels between uses is highly impractical. In fact the rod and reel may be left on the deck when not in use where they can readily be damaged. There is also the problem that despite the best intention, most fisherman quickly get out of the practice of removing and repackaging the reels after a short while.

A more common practice is to place the rod and reel combinations in rod holders. This however is not particularly effective. The rod and reel combination is typically held by the rod handle and the tip of the rod. When the boat rocks, the rod with reel attached will rotate in the rod holder. The weight of the reel can then cause reels to smash into adjacent reels or into the mounting surface causing to damage the reel. An additional problem encountered when storing the rods and reels in the horizontal position is that the rod can slide in the rod holder with the weight of reel causing the tip of the rod to be driven forward into a bulkhead and being broken. A further problem of storing rod and reel combinations in a rod holder mounted horizontally is that the rod is held at the tip and end of the handle. The weight of the reel between the tip and the handle can cause the tip portion to be bent out of shape and take a permanent set.

A further method suggested was to use special brackets having fixed widths to fit snugly between the harness lugs of the reels. The brackets had spring loaded studs that engaged the apertures in the lugs. This initially appeared to have considerable promise but in actual practice was generally impractical. The distance between the harness lugs of reels is different for different models from the same manufacturer and for similar models of reels from different manufacturers. It was therefore necessary to have a bracket specifically sized to fit a particular reel. This was expensive in that a given sport fishing boat might carry a number of different reels and different brackets were required for each type of reel. In addition the particular combination of rods and reels carried on a boat often changed from fishing trip to fishing trip depending on the particular type of game fishing. A further problem was that if a guest brought his own rod and reel there would be no suitable bracket to hold his reel. Last but no least the fixed sized brackets were difficult to use. The opposing spring loaded studs had to be compressed simultaneously into the bracket to install or remove the reel from the bracket. This was difficult if the boat was rolling and pitching in rough seas. For the above noted reason the prior art fixed sized brackets have not found wide spread acceptance.

Accordingly, what is required is a mounting bracket which can securely hold a rod and reel between uses to protect the reel from damage; be easy to use; and which can be adjusted to accommodated different widths of reels. A further desirable property is that the selected rod and reel combinations can be quickly removed or installed in the bracket even under rough sea conditions.

SUMMARY OF THE INVENTION

In accordance with this invention an adjustable bracket is provided for holding game fishing reels having harness lugs. The bracket is comprised of a fixed section that can be attached to a bulkhead, overhead or the like of a boat or the ceiling or wall of a building. The bracket has a guide section for holding the reel. The guide section has an elongated slot that extends the length of the guide section. A pair of opposing members are engaged with the guide slot. The pair of opposing members, each has a stud which is spaced apart from and extending parallel to the guide section of the bracket. The studs are sized to mate with apertures of the harness lugs. At least one of the opposing members is manually releasable so that it can be moved along the length of the guide slot and locked in placed at a selected distance from the other opposing member. In use, a game fishing reel having a pair harness lugs is locked in position by inserting one of the studs into the aperture of one of the harness lugs and then moving the opposing member along the guide until its stud engages the aperture of the other harness lug. The opposing member is then locked in place thereby securely holding the reel in position.

DETAILED DESCRIPTION OF THE PREFERRED EMBODIMENTS

Figure 1:
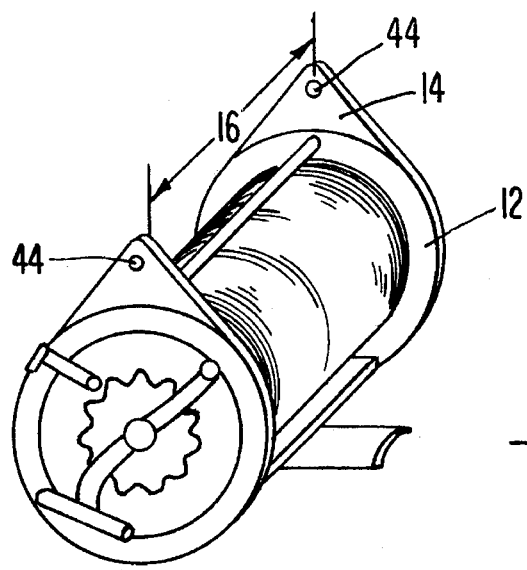
FIG. 1 is a isometric illustration of a game fishing reel having harness lugs.

The fishing reel bracket of this invention 10 is designed for use with game fishing reels 12 have harness lugs 14 for attaching a fighting harness (not shown). A typical fishing reel 12 of this type is shown in FIG. 1. The spacing 16 between the harness lugs 14 is different for each reel model of the same manufacture and for the same type of reels from other manufacturer. In general the larger the overall size of the reel the greater the spacing 16 between the harness lugs. The spacing 16 of the harness lugs 14 from each other can be from a few inches to 10 inches or more.

Figure 2:
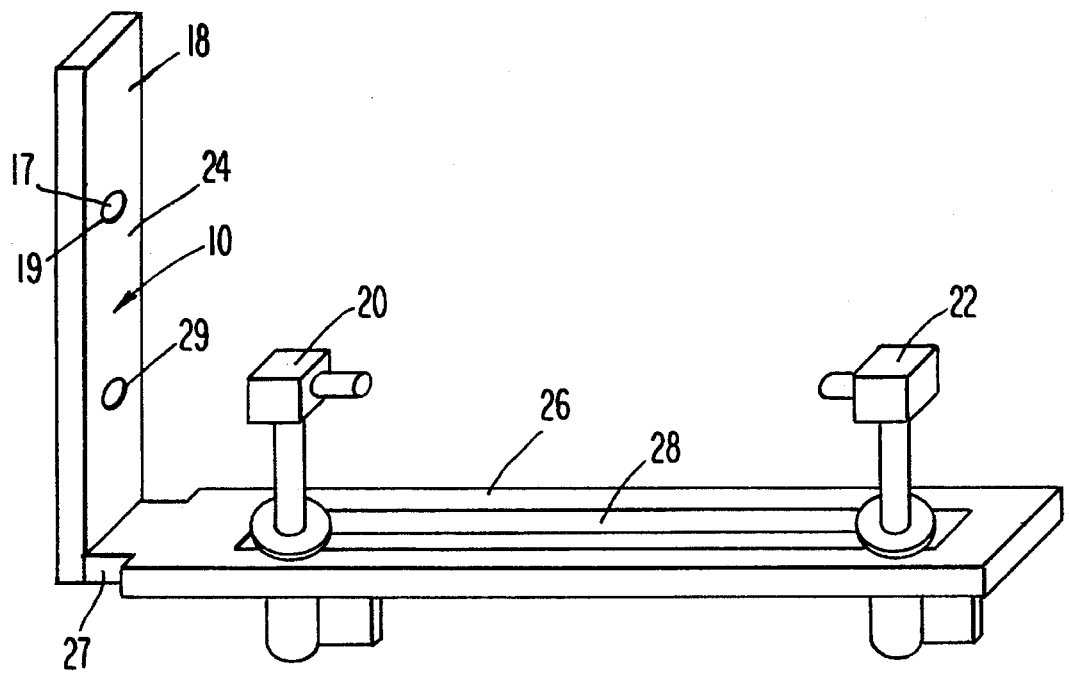
FIG. 2 is an isometric illustration of a preferred embodiment of the fishing reel bracket of this invention for use on a vertical surface.

The bracket 10 shown in FIG. 2 is comprised of a fixed section 18 and pair of opposing adjustable holders 20, 22 secured to the fixed section 18. The fixed section 18 is formed in a right angle having a vertical portion 24 and an elongated horizontal section 26. The vertical section 24 includes means 25, 27 for securing the bracket to a wall or the like. As shown in the drawing vertical portion 24 is sized to fit into a track (not shown) or to be secured directly to a wall with screws or the like through the apertures 29 in the vertical section 24. The elongated horizontal section 24 has a guide slot 28 of a predetermined length which corresponds to the the maximum distance between the lugs 14 of reels 12 to be mounted in the bracket 12 of this invention.

The pair of adjustable holders 20, 22 are inserted though the guide slot 28 and are moveable along the length of the guide slot 28.

Figure 3:
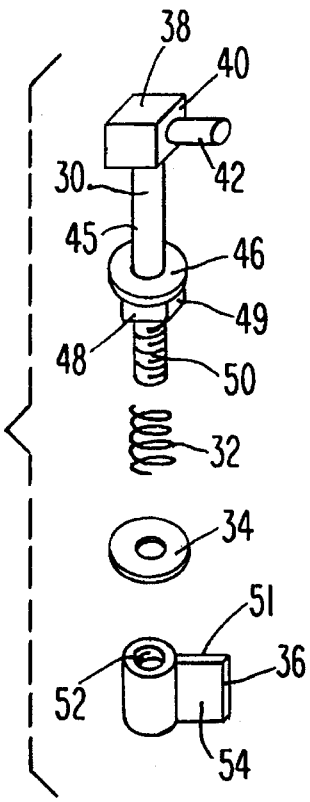
FIG. 3 is a blowup of the adjustable assembly of the fishing reel bracket shown in FIG. 2.

As shown in FIG. 3, the adjustable holders 20, 22 are comprised of a bolt 30, a compression spring 32, a washer 34 and a lever nut 36. At the upper terminal end 38 of the bolt 30 a boss 40 is formed which has a stud 42 extending from it at a right angle. The stud 42 has a length and diameter so as to mate with the apertures 45 in the lugs 14 of a fishing reel 12. The bolt 30 further includes an unthreaded shaft portion 44 extending from the upper terminal end 38 to a point intermediate the ends of the bolt 30 where a fixed stop 46 is formed which has a diameter which is larger than the width guide slot 28. The fixed stop 46 spaces the stud 46 from the guide portion 26 of the bracket 12. A guide follower 46 is just below fixed stop 42. The guide follower 48 has flat sides 49 which guide the adjustable holder 20 in the guide slot 28. The lower portion 50 of the bolt 30 is threaded. The lower portion 50 of the bolt 30 is engaged with a releasable means 51 for locking the holder in place, which is shown in the drawing is a lever nut 36. The lever nut 36 includes a female thread 52 which mates with the threaded end of the bolt 30. The lever nut 30 has an extension 54 which allows a fisherman to more easily tighten and loosen the lever nut 30 from the bolt 30.

As seen in FIG. 2 the bolt 30 is inserted through the guide slot 28 with the guide follower 46 in the guide slot 28. The spring 32, the washer 34, and the lever nut 36 are connected to the threaded portion of the bolt 30. The lever nut 36 is loosened to move the adjustable holders 20, 22 along the guide slot 28 and then tighten to fix the holders 20,22 in position.

In the embodiment shown in FIG. 2 both of the holders 20,22 are adjustable. This is of advantage in that it allows reels to be centered on the bracket 12. However only one of the holder 20, 22 needs to be adjustable in accordance with this invention.

Figure 4:
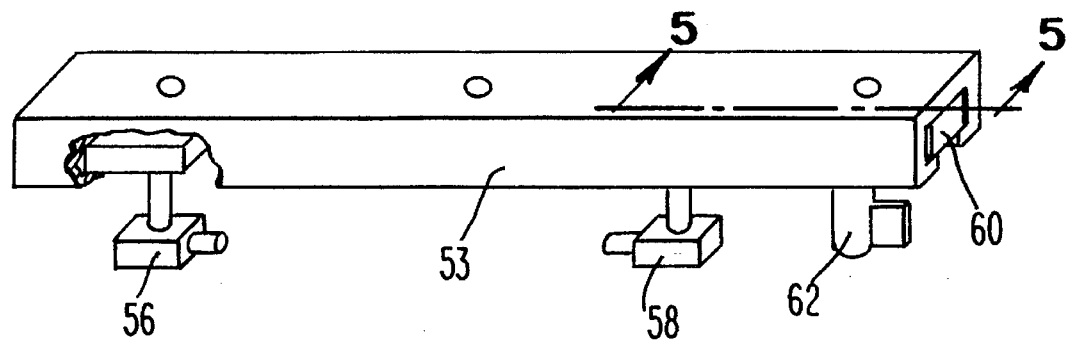
FIG. 4 is an isometric illustration of an additional embodiment of the fishing reel bracket of this invention for use on an overhead surface.
Figure 5:
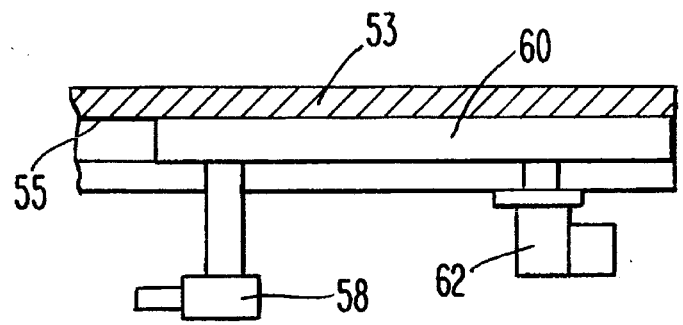
FIG. 5 is an illustration in cross section taken as indicated by the lines and arrows 4—4 on FIG. 4.

An alternate embodiment of the invention is shown in FIGS. 4 and 5. The guide portion of this embodiment is a track 53 which can be secured directly to an overhead surface. A guide slot 55 extends the entire length of the track 53. One of the holder 56 as shown is fixed in position in the guide track 53. The other holder 58 is adjustable and has a guide follower 60 which is inside the track 53 and can be locked in position using the lever nut 62. The embodiment shown in FIGS. 4 and 5 is operated in substantially the same manner as the embodiment shown is FIG. 2.

Figure 6:
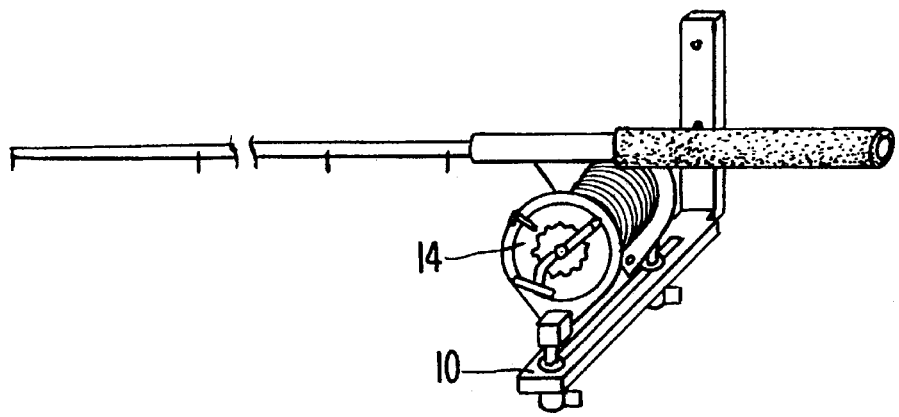
FIG. 6 is a pictorial illustration of a rod and reel secured in place with the fishing reel bracket of this invention.

As shown in FIG. 6 the bracket 12 of this invention a rod and reel combination can be securely held by the bracket 10 of this invention. The fishing reel bracket 12 is attached to a bulkhead or the like. A rod and reel combination having a reel with harness lugs 14 can the be held in place by first loosening at least one of holder 20,22. The reel 10 is then placed between the holders 20,22 and the holders adjusted so that the studs are in the apertures of the harness lugs 14 and the holders 20,22 are tightened in place. A rod guide 64 is preferablly used to prevent movement of the tip of the rod.

Various modifications and changes can be made to the fishing reel bracket of this invention within the scope of this invention. The individual parts can be made in different shapes and sizes provided they still function in the same mamnner. For example the lever nut can be replaced with a knurled nut or the like. In addition the threaded assembly can be replaced with a cam lock to allow for quicker release and tightening of the holders. The holders can be turned around so the the studs extend outwardly from each other so the reel is held from the inside of the lugs rather than from the outside. All such modifications and changes are included within the spirt and scope of the subjoined claims.

What is claimed is:

1. An adjustable bracket for holding fishing reels having spaced apart harness lugs with apertures of a given diameter, wherein the harness lugs of different reels are spaced apart different distances, said bracket being comprised of:

(a) a fixed section having means for securing the bracket to a structure, and an elongated guide portion having a guide slot of a length corresponding to the maxium distance between the harness lugs of reels to be held in the bracket, (b) a pair of opposing holders at least one of which is adjustable in position with respect to the other holder, said holders having studs positioned to engage the apertures in the harness lugs of a reel to be held in the bracket, said holders being positioned within the guide slot of the fixed section, the adjustable holder having a guide follower engaged with the guide slot and releaseable means for locking the holder in place at a selected position along the guide slot;

whereby reels having different distances between their respective harness lugs can be mounted using the same bracket by adjusting the distance between the holders of the bracket.

2. The bracket according to claim 1 wherein one of the holders is fixed in position and the other holder is adjustable.

3. The bracket according claim 1 wherein both of the holders are adjustable.

4. The bracket according to claim 1 wherein the fixed section has a vertical portion for securing the bracket to a structure and a horizonial section which includes the guide slot, whereby a rod and reel can be mounted in the horizonial position.

5. The bracket according according to claim one wherein the fixed section is a mounting track.

* * * * *